US011378964B2

(12) United States Patent
Wei

(10) Patent No.: US 11,378,964 B2
(45) Date of Patent: Jul. 5, 2022

(54) SYSTEMS AND METHODS FOR AUTONOMOUS MOVEMENT OF MATERIAL

(71) Applicant: Caterpillar Inc., Peoria, IL (US)

(72) Inventor: Mo Wei, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 283 days.

(21) Appl. No.: 16/666,080

(22) Filed: Oct. 28, 2019

(65) Prior Publication Data

US 2021/0124359 A1 Apr. 29, 2021

(51) Int. Cl.
*G05D 1/02* (2020.01)
*G05D 1/00* (2006.01)

(52) U.S. Cl.
CPC ......... *G05D 1/0217* (2013.01); *G05D 1/0088* (2013.01); *G05D 1/0278* (2013.01)

(58) Field of Classification Search
CPC .. G05D 1/0217; G05D 1/0088; G05D 1/0278; G05D 1/0212; G05D 1/0276
See application file for complete search history.

(56) References Cited

U.S. PATENT DOCUMENTS

| | | | |
|---|---|---|---|
| 8,386,110 B2 | 2/2013 | Maekawa et al. | |
| 8,903,689 B2 | 12/2014 | Dunbabin et al. | |
| 8,948,981 B2 | 2/2015 | Wei et al. | |
| 10,186,004 B2 | 1/2019 | Wei et al. | |
| 2004/0158355 A1* | 8/2004 | Holmqvist | G05D 1/0274 700/245 |
| 2009/0076674 A1* | 3/2009 | Kiegerl | E02F 9/264 701/26 |
| 2014/0180548 A1* | 6/2014 | Edara | G05B 13/024 701/50 |
| 2015/0046044 A1 | 2/2015 | Martinsson | |
| 2018/0150779 A1* | 5/2018 | Wei | E02F 3/7609 |
| 2018/0347154 A1* | 12/2018 | Martinsson | E02F 3/431 |

FOREIGN PATENT DOCUMENTS

JP 5110741 12/2012

* cited by examiner

*Primary Examiner* — Aniss Chad
*Assistant Examiner* — Christine Nguyen Huynh
(74) *Attorney, Agent, or Firm* — Lee & Hayes, PLLC

(57) ABSTRACT

A method includes sensing, with a sensor, an outer surface of a pile of material, with a controller located on an at least partially autonomously-controlled machine, a midpoint of the pile of material based on the sensed outer surface; determining, with the controller, a plurality of potential loading paths around the midpoint for loading the machine; selecting, with the controller, a primary loading path of the potential loading paths based on a cost function analysis, and causing, with the controller, the machine to perform a loading instance as defined by the primary loading path.

20 Claims, 4 Drawing Sheets

SYSTEMS AND METHODS FOR AUTONOMOUS MOVEMENT OF MATERIAL

TECHNICAL FIELD

The present disclosure relates to systems and methods for movement of material. More specifically, the present disclosure relates to systems and methods for loading at least partially-autonomous machines with material from a pile in an efficient manner.

BACKGROUND

In some applications, soil, gravel, minerals, overburden and/or other material may be moved from one place to another in a worksite. For example, material may be excavated from an offsite location and moved to a worksite to serve as building material for a worksurface of the worksite. The material may be temporarily stored in a pile for later distribution to separate parts of the worksite. A machine such as a loading machine may load a work tool such as a bucket with material. The work tool may be coupled to and actuated by the loading machine. The machine may approach the pile of material, dig into the pile of material, and scoop the material into the bucket. A human operator may be trained and gain experience to understand how the material may most effectively loaded into the bucket. However, a human operator may be expensive to employ and may increase potential liability if an accident should occur on the worksite. Therefore, an autonomous or semi-autonomous machine may be used to improve worksite safety, and to improve the operational efficiency associated with movement of the pile or material.

The loading machine may iteratively travel from the pile of material to the material dumping zone, until the desired amount of material is displaced from the pile of material to the dumping zone. A loading cut-in point can be defined as a point at a boundary of the pile at which a work tool of the loading machine digs into the pile to obtain a load of material from the pile. A loading direction is the direction of travel of the loading machine at the cut-in point and may include directions perpendicular a face of the pile at the cut-in point or angular degrees therefrom. Some example systems may utilize autonomously- or semi-autonomously-operated loading machines that choose a shortest path between the pile of material and the dumping zone to determine a loading cut-in point and/or loading direction of the pile or material. Other example systems may use a direction perpendicular to an edge of the pile of material to determine the loading cut-in point and/or loading direction. Still other example systems may choose a direction pointing to a pre-defined or arbitrary point of the pile or material, or chose a direction following the current orientation of the machine. As a result, the pile of material may be disadvantageously divided into multiple, isolated piles that remain for clean-up and may require additional loading operations to load the material into the bucket of the machine. Further, creating the multiple, isolated piles causes the material to be spread across a larger area of the worksite and spread too thin along the surface of the worksite resulting in loss of a larger portion of the material since the material may not be capturable by the machine.

Examples of the present disclosure are directed toward overcoming the deficiencies described above.

SUMMARY

In an example of the present disclosure, a method may include sensing, with a sensor, an outer surface of a pile of material, determining, with a controller located on an at least partially autonomously-controlled machine, a midpoint of the pile of material based on the sensed outer surface; determining, with the controller, a plurality of potential loading paths around the midpoint for loading the machine; selecting, with the controller, a primary loading path of the potential loading paths based on a cost function analysis, and causing, with the controller, the machine to perform a loading instance as defined by the primary loading path.

In another example of the present disclosure, a system includes an at least partially-autonomous machine configured to travel along a work surface of a worksite. The machine includes a work tool configured to carry material as the machine travels along the work surface. The system further includes a sensor configured to sense an outer surface of a pile of material, and a controller in communication with the sensor and the machine. The controller is configured to determine a midpoint of the pile of material based on a sensed outer surface, determine a plurality of potential loading paths around the midpoint for loading the machine, and cause the machine to perform a loading instance as defined by the primary loading path.

In yet another example of the present disclosure, a system may include an at least partially autonomously-controlled machine including a work tool configured to carry material as the machine travels along the work surface, a sensor configured to sense an outer surface of a pile of material determine a midpoint of a pile of a material, and a controller in communication with the sensor and the machine via a communications network. The controller is configured to determine a midpoint of the pile of material based on a sensed outer surface, determine a plurality of potential loading paths around the midpoint for loading the machine, select a primary loading path of the potential loading paths based on a cost function analysis, and cause the machine to perform a loading instance as defined by the primary loading path.

DETAILED DESCRIPTION

Figure 1:
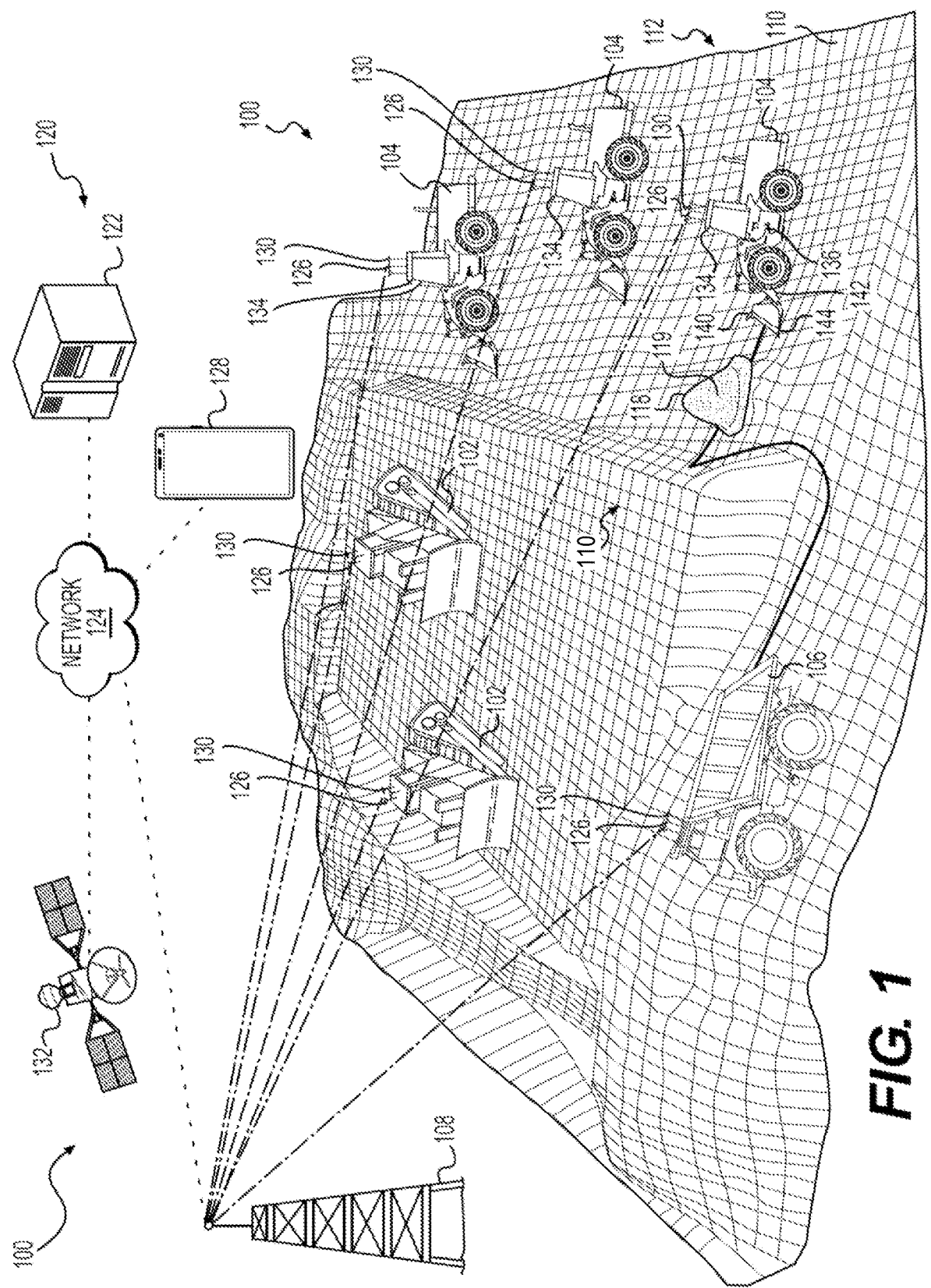
FIG. 1 is a schematic illustration of a system in accordance with an example embodiment of the present disclosure.

Wherever possible, the same reference numbers will be used throughout the drawings to refer to the same or like parts. FIG. 1 is a schematic illustration of a system 100 in accordance with an example embodiment of the present disclosure. The example system 100 shown in FIG. 1 may include one or more machines operating at a worksite 112 to perform various tasks. For example, the system 100 may include one or more digging machines 102, one or more loading machines 104, one or more hauling machines 106, and/or other types of machines used for construction, mining, paving, excavation, and/or other operations at the worksite 112. Each of the machines described herein may be in communication with each other and/or with a local or remote-control system 120 by way of one or more central stations 108. The central station 108 may facilitate wireless communication between the machines described herein and/or between such machines and, for example, a system controller 122 of the control system 120, for the purpose of transmitting and/or receiving operational data and/or instructions.

A digging machine 102 may refer to any machine that reduces material at the worksite 112 for the purpose of subsequent operations (i.e., for blasting, loading, hauling, and/or other operations). Examples of digging machines 102 may include excavators, backhoes, dozers, drilling machines, trenchers, drag lines, etc. Multiple digging machines 102 may be co-located within a common area at the worksite 112 and may perform similar functions. For example, one or more of the digging machines may move soil, sand, minerals, gravel, concrete, asphalt, overburden, and/or other material comprising at least part of a work surface 110 of the worksite 112. As such, under normal conditions, each of the co-located digging machines 102 may have similar productivity and efficiency when exposed to similar site conditions.

A loading machine 104 may refer to any machine that lifts, carries, loads, and/or removes material that has been reduced by one or more of the digging machines 102. In some examples, a loading machine 104 may remove such material, and may transport the removed material from a first location at the worksite 112 to a second location at the worksite 112. Examples of a loading machine 104 may include a wheeled or tracked loader, a front shovel, an excavator, a cable shovel, a stack reclaimer, or any other similar machine. One or more loading machines 104 may operate within common areas of worksite 112 to, for example, load reduced materials onto a hauling machine 106. For example, the loading machines 104 described herein may traverse one or more travel paths on the work surface 110 as defined by the method identifying an effective manner of moving the material 119 and effective and efficient travel paths. In one example, such travel paths may include those paths between the pile 118 of material 119 and a dump site of the material that may prove most efficient in time, distance, and fuel use of the loading machine 104. In another example, such travel paths may include one or more partially or completely formed roads, bridges, tracks, paths, or other surfaces formed by the work surface 110 and passable by the construction, mining, paving machines, and/or other example machines described herein. In the example one such travel path may extend from a pile 118 or other collection of material 119 removed by the one or more digging machines 102 and/or loading machines 104 at the worksite 112 to a number of other locations within the worksite 112. Detailed description regarding the paths the digging machines 102 and/or loading machines 104 may take in moving the material is presented in more detail herein. Further, the manner in which the digging machines 102 and/or loading machines 104 may address the pile 118 of material 119 and how the digging machines 102 and/or loading machines 104 use their respective work tools 140 to dig into the pile and obtain a full load or at least as full of a load as possible in an effective and efficient manner is also described in greater detail below. In some examples, one or more ditches, ruts, potholes, build-ups or piles 118 of material 119, or other imperfections may be disposed on or formed by the work surface 110. In some such examples, and as shown in FIG. 1, a pile 118 may be located along one or more travel paths of the loading machine 104 or other machines described herein. In such examples, the system 100 may be configured to identify the pile 118, and to determine various travel parameters of the machine (e.g., an alternate travel path, a travel speed of the machine, etc.) based at least partly on identifying the pile 118. Controlling the machine to operate based on such travel parameters may reduce the time and resources required for the machine (e.g., the loading machine 104) to accomplish a desired task, may reduce the risk of damage to the machine, and may improve the overall efficiency of the system 100. Controlling the machine to operate based on such travel parameters may also reduce the risk of harm or injury to an operator of the machine. A hauling machine 106 may refer to any machine that carries the excavated materials between different locations within the worksite 112. Examples of hauling machines 106 may include an articulated truck, an off-highway truck, an on-highway dump truck, a wheel tractor scraper, or any other similar machine. Laden hauling machines 106 may carry overburden from areas of excavation within worksite 112, along haul roads to various dump sites, and return to the same or different excavation areas to be loaded again. With continued reference to FIG. 1, in some examples the control system 120 and/or the system controller 122 may be located at a command center (not shown) remote from the worksite 112. In other examples, the system controller 122 and/or one or more components of the control system 120 may be located at the worksite 112. Regardless of the location of the various components of the control system 120, such components may be configured to facilitate communications between, and to provide information to, the digging machines 102, loading machines 104, hauling machines 106, and/or other machines of the system 100 (referred to collectively as equipment hereafter). In any of the examples described herein, the functionality of the system controller 122 may be distributed so that certain operations are performed at the worksite 112 and other operations are performed remotely (e.g., at the remote command center noted above). For example, some operations of the system controller 122 may be performed at the worksite 112, on one or more of the digging machines 102, one or more of the loading machines 104, one or more of the hauling machines 106, etc. It is understood that the system controller 122 may comprise a component of the system 100, a component of one or more of the machines disposed at the worksite 112, a component of a separate mobile device (e.g., a mobile phone, a tablet, a laptop computer, etc.), and/or the control system 120.

The system controller 122 may be an electronic controller that operates in a logical fashion to perform operations, execute control algorithms, store and retrieve data and other desired operations. The system controller 122 may include or access memory, secondary storage devices, processors, and any other components for running/executing an application. The memory and secondary storage devices may be in the form of read-only memory (ROM) or random access memory (RAM) or integrated circuitry that is accessible by the controller. Various other circuits may be associated with the system controller 122 such as power supply circuitry, signal conditioning circuitry, driver circuitry, and other types of circuitry.

The system controller 122 may be a single controller or may include more than one controller (such as additional controllers associated with each of the equipment) configured to control various functions and/or features of the system 100. As used herein, the term "controller" is meant in its broadest sense to include one or more controllers, processors, central processing units, and/or microprocessors that may be associated with the system 100, and that may cooperate in controlling various functions and operations of the machines included in the system 100. The functionality of the system controller 122 may be implemented in hardware and/or software without regard to the functionality. The system controller 122 may rely on one or more data maps, look-up tables, neural networks, algorithms, machine learning algorithms, and/or other components relating to the operating conditions and the operating environment of the system 100 that may be stored in the memory of the system controller 122. Each of the data maps noted above may include a collection of data in the form of tables, graphs, and/or equations to maximize the performance and efficiency of the system 100 and its operation.

The components of the control system 120 may be in communication with and/or otherwise operably connected to any of the components of the system 100 via a network 124. The network 124 may be a local area network (LAN), a larger network such as a wide area network (WAN), or a collection of networks, such as the Internet. Protocols for network communication, such as TCP/IP, may be used to implement the network 124. Although embodiments are described herein as using a network 124 such as the Internet, other distribution techniques may be implemented that transmit information via memory cards, flash memory, or other portable memory devices.

It is also understood that the equipment may include respective controllers, and each of the respective controllers described herein (including the system controller 122) may be in communication and/or may otherwise be operably connected via the network 124. For example, the network 124 may comprise a component of a wireless communication system of the system 100, and as part of such a wireless communication system, the equipment may include respective communication devices 126. Such communication devices 126 may be configured to permit wireless transmission of a plurality of signals, instructions, and/or information between the system controller 122 and the respective controllers of the equipment. Such communication devices 126 may also be configured to permit communication with other machines and systems remote from the worksite 112. For example, such communication devices 126 may include a transmitter configured to transmit signals (e.g., via the central station 108 and over the network 124) to a receiver of one or more other such communication devices 126. In such examples, each communication device 126 may also include a receiver configured to receive such signals (e.g., via the central station 108 and over the network 124). In some examples, the transmitter and the receiver of a particular communication device 126 may be combined as a transceiver or other such component. In any of the examples described herein, such communication devices 126 may also enable communication (e.g., via the central station 108 and over the network 124) with one or more tablets, computers, cellular/wireless telephones, personal digital assistants, mobile devices, or other electronic devices 128 located at the worksite 112 and/or remote from the worksite 112. Such electronic devices 128 may comprise, for example, mobile phones and/or tablets of project managers (e.g., foremen) overseeing daily operations at the worksite 112.

The network 124, communication devices 126, and/or other components of the wireless communication system described above may implement or utilize any desired system or protocol including any of a plurality of communications standards. The desired protocols will permit communication between the system controller 122, one or more of the communication devices 126, and/or any other desired machines or components of the system 100. Examples of wireless communications systems or protocols that may be used by the system 100 described herein include a wireless personal area network such as Bluetooth® (e.g., IEEE 802.15), a local area network such as IEEE 802.11b or 802.11g, a cellular network, or any other system or protocol for data transfer. Other wireless communication systems and configurations are contemplated. In some instances, wireless communications may be transmitted and received directly between the control system 120 and a machine (e.g., a paving machine 106, a haul truck 104, etc.) of the system 100 or between such machines. In other instances, the communications may be automatically routed without the need for re-transmission by remote personnel.

In example embodiments, one or more machines of the system 100 (e.g., the one or more digging machines 102, loading machines 104, hauling machines 106, etc.) may include a location sensor 130 configured to determine a location, speed, heading, and/or orientation of the respective machine. In such embodiments, the communication device 126 of the respective machine may be configured to generate and/or transmit signals indicative of such determined locations, speeds, headings, and/or orientations to, for example, the system controller 122 and/or to the other respective machines of the system 100. Further, in one example, the location sensor 130 of each of the machines may be configured to assist the machine in determine the location of the machine with respect to, for example, a pile 118 of material 119. In this example, the location sensor 130 may be used to determine an effective path to the pile 118 of material 119, and a number of cut-in points when a portion of the pile 118 of material 119 is to be loaded into a work tool 140 of the machine. Further, in this example, the location sensor 130 may also be used to determine a number of load directions for each of the number of cut-in points. More regarding the function of the location sensor 130 in loading the pile 118 of material 119 into the machines is described herein.

In some examples, the location sensors 130 of the respective machines may include and/or comprise a component of global navigation satellite system (GNSS) or a global positioning system (GPS). Alternatively, universal total stations (UTS) may be utilized to locate respective positions of the machines. In example embodiments, one or more of the location sensors 130 described herein may comprise a GPS receiver, transmitter, transceiver, laser prisms, and/or other such device, and the location sensor 130 may be in communication with one or more GPS satellites 132 and/or UTS to determine a respective location of the machine to which the location sensor 130 is connected continuously, substantially continuously, or at various time intervals. One or more additional machines of the system 100 may also be in communication with the one or more GPS satellites 132 and/or UTS, and such GPS satellites 132 and/or UTS may also be configured to determine respective locations of such additional machines. In any of the examples described herein, machine locations, speeds, headings, orientations, and/or other parameters determined by the respective location sensors 130 may be used by the system controller 122 and/or other components of the system 100 to coordinate activities of the digging machines 102, loading machines 104, hauling machines 106, and/or other components of the system 100. Further, in any of the examples described herein, machine locations, speeds, headings, orientations, and/or other parameters determined by the respective location sensors 130 may be used by the system controller 122 and/or other components of the system 100 to move portions of the pile 118 of material 119 throughout the worksite 112 as described herein.

In one example, a location determined by a location sensor 130 carried by a loading machine 104 may be used by the system controller 122 and/or by a controller 136 of the loading machine 104 to determine a travel path extending from a current location of the loading machine 104 to a location of the pile 118 of material 119, and to a location of a dumping site within the worksite 112. In such examples, the controller 136 of the loading machine 104 may control the loading machine 104 to traverse at least part of the worksite 112 along a path in order to accomplish one or more tasks at the worksite 112 including the movement of material within the pile 118. Further, the controller 136 of the loading machine 104 may control the loading machine 104 to approach the pile 118 of material 119 along an effective path. Still further, the controller 136 of the loading machine 104 may control the loading machine 104 to dig from the number of cut-in points using at least one of the number of load directions. Such determined travel paths may be useful in maximizing the efficiency of operation of the loading machine 104 in moving material from the pile 118 to other portions of the worksite 112, and in maximizing the efficiency of the system 100, generally. In the examples described herein, the controller 136 may be or include an electronic control module (ECM).

In any of the examples described herein, the system controller 122 and/or the respective controllers 136 of the various machines of the system 100 may be configured to generate a user interface displayed on a display device associated with the system controller 122 and/or the machines 102, 104, 106 that includes, among other things, information indicative of the travel paths, travel speeds, orientations, and/or other travel parameters of the respective machines. Further, the system controller 122 and/or the respective controllers 136 may be configured to generate on the user interface information indicative of the path used by the loading machine 104 to approach the pile 118 of material 119, the number of cut-in points, and/or the number of load directions.

In some examples, and in addition to the various travel parameters described above, the system controller 122 and/or the controller 136 of the loading machine 104 may also determine one or more work tool positions associated with a work tool 140 of the loading machine 104. In such examples, the user interface may also include information indicative of the determined work tool positions. As will be described in greater detail below, each of the work tool positions may correspond to a respective location along at least one of the travel paths, the path used by the loading machine 104 to approach the pile 118 of material 119, the number of cut-in points, and/or the number of load directions. In any of the examples described herein, such user interfaces may be generated and provided by the controller 136 to, for example, the electronic device 128 (e.g., via the network 124), a display of the loading machine 104, the system controller 122 (e.g., via the network 124), and/or to one or more components of the system 100 for display. Additionally or alternatively, such user interfaces may be generated and provided by the system controller 122 to, for example, the electronic device 128 (e.g., via the network 124), a display of the loading machine 104, the controller 136 (e.g., via the network 124), and/or to one or more components of the system 100 for display. In any of the examples described herein, one or more of the equipment may be manually controlled, semi-autonomously controlled, and/or fully-autonomously controlled. In examples in which the equipment are operating under autonomous or semi-autonomous control, the speed, steering, work tool positioning/movement, and/or other functions of such machines may be controlled automatically or semi-automatically based at least in part on the determined travel parameters and/or work tool positions described herein.

With continued reference to FIG. 1, and as noted above, each of the equipment may include a controller 136, and such a controller 136 may comprise a component of a local control system on-board and/or otherwise carried by the respective machine. Such controllers 136 may be generally similar or identical to the system controller 122 of the control system 120. For example, each such controller 136 may comprise one or more processors, a memory, and/or other components described herein with respect to the system controller 122. In some examples, a controller 136 may be located on a respective one of the loading machines 104, and may also include components located remotely from the respective one of the loading machines 104, such as on any of the other machines of the system 100 or at the command center described above. Thus, in some examples the functionality of the controller 136 may be distributed so that certain functions are performed on the respective one of the loading machines 104 and other functions are performed remotely. In some examples, controller 136 of the local control system carried by a respective machine may enable autonomous and/or semi-autonomous control of the respective machine either alone or in combination with the control system 120.

Further, in addition to the communication devices 126 and location sensors 130 described above, one or more of the equipment may include a perception sensor 134 configured to determine one or more characteristics of the work surface 110. For instance, the controller 136 of a particular machine may be electrically connected to and/or otherwise in communication with the communication device 126, the location sensor 130, and the perception sensor 134 carried by the particular machine, and the perception sensor 134 may be configured to sense, detect, observe, and/or otherwise determine various characteristic of the work surface 110. In one example, the perception sensor 134 may be configured to sense, detect, observe, and/or otherwise determine various characteristic of the pile 118 of material 119 that is to be distributed throughout the worksite 112. The perception sensor 134 may include at least one of a position sensor, an imaging device, or other sensing device. Further, in one example, the GPS satellite 132 may include an imaging device that may capture an image of the pile 118 of material 119 and transmit that image to the one or more of the equipment for use in determining a shape or outline of the pile 118 of material 119. More details regarding the perception sensor 134 is described below.

In some examples, one or more of the communication device 126, the location sensor 130, and the perception sensor 134 may be fixed to the cab, chassis, frame, and/or any other component of the respective machine. In other examples, however, one or more of the communication device 126, the location sensor 130, and the perception sensor 134 may be removably attached to a respective machine and/or disposed within, for example, the cab of such a machine during operation.

In some examples, the perception sensor 134 may comprise a single sensor and/or other component of a local perception system disposed on the machine (e.g., disposed on a loading machine 104). In other examples, the perception sensor 134 may comprise a plurality of like or different sensors (e.g., a sensor array), each of which comprises a component of such a local perception system disposed on the machine. For example, the perception sensor 134 may comprise, among other things, an image capture device. Such an image capture device may be any type of device configured to capture images representative of the work surface 110, the work site 112, the pile 118 of material 119, and/or other environments within a field of view of the image capture device. For instance, an example image capture device may comprise one or more cameras such as, for example, RGB-cameras, monochrome cameras, intensity (grey scale) cameras, infrared cameras, ultraviolet cameras, depth cameras, stereo cameras, etc.). Such an image capture device may be configured to capture image data representing, for example, a length, width, height, depth, volume, color, texture, composition, radiation emission, and/or other characteristics of one or more objects including, for example, the pile 118 of material 119 within the field of view of the image capture device. For example, such characteristics may also include one or more of an x-position (global position coordinate), a y-position (global position coordinate), a z-position (global position coordinate), an orientation (e.g., a roll, pitch, yaw), an object type (e.g., a classification), a velocity of the object, and an acceleration of the object, among others. It is understood that one or more such characteristics (e.g., a location, a dimension, a volume, etc.) may be determined by the image capture device alone or in combination with the location sensor 130 described above. Characteristics associated with the work surface 110 and/or associated with the worksite 112 may also include, but are not limited to, a presence of another machine, person, or other object in the field of view of the perception sensor 134, a time of day, a day of a week, a season, a weather condition, and an indication of darkness/light, among other characteristics. In one example, the characteristics associated with the work surface 110 and/or associated with the worksite 112 may be captured by the location sensor 130 and/or the perception sensor 126 in real time. In this example, real-time capture of data from the location sensor 130 and/or the perception sensor 126 provides for advantages within an iterative movement of material 119 from the pile 118. For example, as the loading machine(s) 104 move(s) between the pile 118 and a dump site, the location sensor 130 and/or the perception sensor 126 may capture data defining a position and direction of travel of the loading machine 104, a location of the pile 118, a shape of the pile, and other characteristics of the work surface 110 and/or the worksite 112. This allows the system controller 122 and/or a controller 136 of the loading machine 104 to more effectively and expeditiously determine a most effective travel path of the loading machine, and cut-in points and loading directions for the travel path.

The image capture device and/or other components of the perception sensor 134 may also be configured to provide one or more signals to the controller 136 of the machines 102, 104, 106 including such image data or other sensor information captured thereby. Such sensor information may include, for example, a plurality of images captured by the image capture device and indicative of various characteristics of one or more objects including, for example, the pile 118 of the material 119 within the field of view of the image capture device. Each such image may include a respective group of images of the pile 118 and/or other objects detectable by the image capture device. In such examples, the controller 136 and/or the system controller 122 may analyze the sensor information received from the perception sensor 134 to identify the pile 118 indicated by the sensor information (e.g., shown or otherwise included in such images).

The perception sensor 134 and/or the local perception system carried by the machine may also include a light detection and ranging (LIDAR) sensor. Such a LIDAR sensor may include one or more lasers or other light emitters carried by (e.g., mounted on, connected to, etc.) the particular machine 102, 104, 106, as well as one or more light sensors configured to receive radiation radiated, reflected, and/or otherwise returned by an object onto which light from such light emitters has been impinged. In example embodiments, such a LIDAR sensor may be configured such that the one or more lasers or other light emitters are mounted to spin (e.g., about a substantially vertical axis), thereby causing the light emitters to sweep through, for example, a 360 degree range of motion, to capture LIDAR sensor data associated with the pile 118 of material 119, the work surface 110, and/or the worksite 112, generally. For example, a LIDAR sensor of the present disclosure may have a light emitter and a light sensor, with the light emitter including one or more lasers that direct highly focused light toward an object or surface, which reflects the light back to the light sensor, though any other light emission and detection to determine range is contemplated (e.g., flash LIDAR, MEMS LIDAR, solid state LIDAR, and the like). Measurements of such a LIDAR sensor may be represented as three-dimensional LIDAR sensor data having coordinates (e.g., Cartesian, polar, etc.) corresponding to positions or distances captured by the LIDAR sensor. For example, three-dimensional LIDAR sensor data and/or other sensor information received from the LIDAR sensor may include a three-dimensional map or point cloud, which may be represented as a plurality of vectors emanating from a light emitter and terminating at an object (e.g., the pile 118) or surface (e.g., the work surface 110). In some examples, converting operations may be used by the controller 136 and/or by the system controller 122 to convert the three-dimensional LIDAR sensor data to multi-channel two-dimensional data. In some examples, the LIDAR sensor data and/or other sensor information received from the perception sensor 134 may be automatically segmented by the controller 136 and/or by the system controller 122, and the segmented LIDAR sensor data may be used, for example, as input for determining trajectories, travel paths, loading cut-in points, loading directions, travel speeds, and/or other travel parameters of the machines described herein (e.g., travel parameters of one or more of the loading machines 104).

The perception sensor 134 and/or the local perception system carried by the machine may also include one or more additional sensors. Such additional sensors may include, for example, a radio detection and ranging (hereinafter, "RADAR") sensor, a sound navigation and ranging (hereinafter, "SONAR") sensor, a depth sensing camera, a ground-penetrating RADAR sensor, a magnetic field emitter/detector, and/or other sensors disposed on the vehicle and configured to detect objects present in the worksite 112. Each of the sensors described herein with respect to the perception sensor 134 and/or the local perception system may output one or more respective signals to the controller 136 and/or to the system controller 122, and such signals may include any of the sensor information described above (e.g., image data, LIDAR data, RADAR data, SONAR data, GPS data, etc.). Such sensor information may be captured simultaneously by the various sensors of the perception sensor 134, and in some instances, the sensor information received from the respective sensors of the perception sensor 134 may include, identify, and/or be indicative of one or more of the same objects (e.g., the pile 118) sensed by such sensors. In such examples, the controller 136 and/or to the system controller 122 may analyze the sensor information received from each of the respective sensors to identify and/or classify the one or more objects indicated by the sensor information.

For example, the controller 136 and/or to the system controller 122 may correlate the output of each sensor modality to a particular object stored in a memory thereof and/or to a particular location of the worksite 112. Using such data association, object recognition, and/or object characterization techniques, the output of each of the sensors described herein can be compared. Through such comparisons, and based at least partly on the sensor information received from the perception sensor 134 and/or the location sensor 130, the controller 136 and/or to the system controller 122 may identify one or more objects located at the worksite 112 (e.g., the pile 118 located within the work surface 110). As noted above, corresponding sensor information received from both the perception sensor 134 and the location sensor 130 may be combined and/or considered together by the controller 136 and/or the system controller 122 in order to determine the location, shape, dimensions, volume, and/or other characteristics of the pile 118 of material 119 described herein.

Further, in some examples, and depending on the accuracy and/or fidelity of the sensor information received from the various sensors associated with the perception sensor 134, the presence, location, orientation, identity, length, width, height, depth, and/or other characteristics of the pile 118 identified by the controller 136 using first sensor information (e.g., LIDAR data) may be verified by the controller 136 using second sensor information (e.g., image data) obtained simultaneously with the first sensor information but from a different sensor or modality of the perception sensor 134. In one example, sensor data obtained from a plurality of perception sensors 134 located in a plurality of equipment may be shared among the machines and used to provide a more accurate and/or complete image of the pile 118.

With continued reference to FIG. 1, in some examples one or more machines including the loading machine 104 within the system 100 may include an implement or other work tool 140 that is coupled to a frame of the machine. For example, in the case of a loading machine 104, the work tool 140 may include a bucket configured to carry material within an open volume or other substantially open space thereof. The loading machine 104 may be configured to, for example, scoop, lift, and/or otherwise load material (e.g., material 119 within the pile 118) into the work tool 140 by lowering the work tool 140 to a loading position. For example, the loading machine 104 may include one or more linkages 142 movably connected to a frame of the loading machine 104. The work tool 140 may be connected to such linkages 142, and the linkages 142 may be used to lower the work tool 140 employing, for example, one or more hydraulic cylinders, electronic motors, or other devices connected thereto. In this manner, the work tool 140 may be lowered to a loading position in which a leading edge 144 of the work tool 140 is disposed proximate, adjacent, and/or at the work surface 110, and a base of the work tool 140 is disposed substantially parallel to the work surface 110. The loading machine 104 may then be controlled to advance toward the pile 118 of material 119 such that the work tool 140 may impact the pile 118 of material 119, a positive-volume imperfection, and/or other object disposed on the work surface 110. The advancement of the loading machine 104 causes the transfer of the material at least partially into the open space of the work tool 140. The linkages 142 may then be controlled to raise, pivot, and/or tilt the work tool 140 to a carrying position above the work surface 110 and substantially out of the view of, for example, an operator controlling movement of the loading machine 104. The loading machine 104 may then be controlled to traverse the work site 112 until the loading machine 104 reaches a dump zone, the hauling machine 106, and/or another location at the work site 112 designated for receiving the removed material being carried by the work tool 140. The linkages 142 may then be controlled to lower, pivot, and/or tilt the work tool 140 to an unloading position in which the material carried within the open space of the work tool 140 may be deposited (e.g., due to the force of gravity acting on the material carried by the work tool 140) at the dump zone, within a bed of the hauling machine 106, and/or as otherwise desired.

Figure 2:
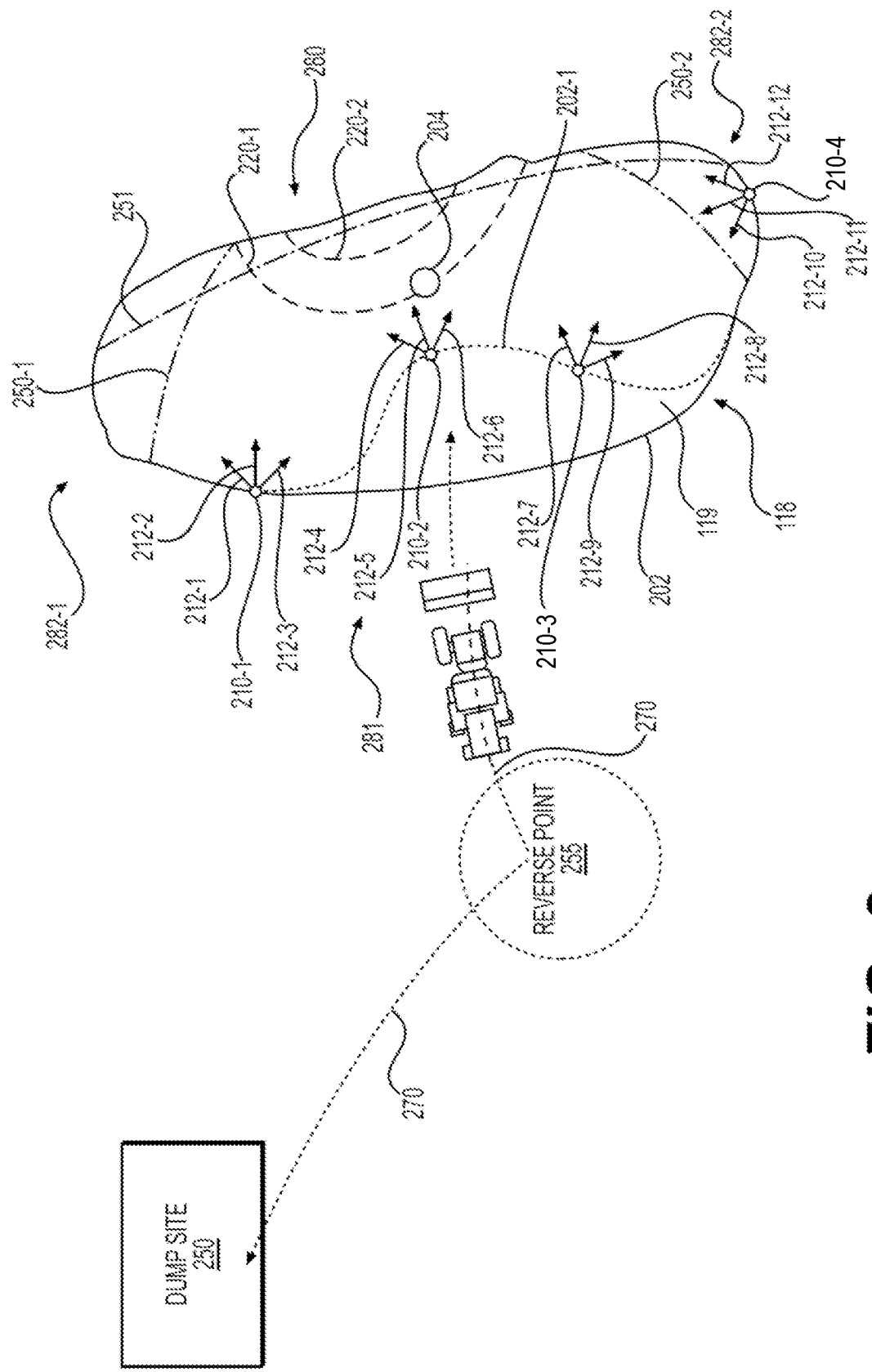
FIG. 2 is another schematic illustration of the system shown in FIG. 1.

FIG. 2 is another schematic illustration of the system 100 shown in FIG. 1. As shown in FIG. 2, in some examples a worksite may include a dump site 250 spaced from the pile 118 of material 119 described above. A loading machine 104 is depicted as traversing a travel path 270 between the pile 118 (serving as a loading site), a reverse point 255, and the dump site 250. The reverse point 255 may be any point at which the loading machine 104 may perform a turn as the loading machine 104 backs away from the pile 118. Any number of reverse points 255 may be used by the loading machine 104 when moving the material 119 from the pile 118 to the dump site 250 and when moving from the dump site 250 to the pile 118. Further, the worksite 112 may include any number of dump sites 250 where the material 119 may be deposited.

In some example operations, an objective of the autonomously-operated or semi-autonomously-operated loading machine 104 may be to move the material 119 from the pile 118 to another portion of the worksite 112 including the dump site 250. In the examples described herein, the loading machine 104 may obtain information from various sensors to move the material 119 within the pile 118. The information sensed by the perception sensor 134, the location sensor 130, and/or other sensors may be transmitted to the controller 136 of the loading machine 104 and/or transmitted to the system controller 122 via the communication device 126, the central station 108, the satellite 132, the network 124, and/or other communication devices for processing by the controller 136 of the loading machine 104 and/or the system controller 122. In one example, the information sensed by the perception sensor 134, the location sensor 130, and/or other sensor may be transmitted to the controller 136 of the loading machine 104 where the controller 136 of the loading machine 104 processes the information without assistance from the resources of the system controller 122. In another example, the information sensed by the perception sensor 134, the location sensor 130, and/or other sensors may be transmitted to the system controller 122 where the system controller 122 of the loading machine 104 processes the information without assistance from the resources of the controller 136 of the loading machine 104. In still another example, the system controller 122 and the controller 136 of the loading machine 104 may both participate in the processing of the information.

The system 100 of FIG. 1 as used in connection with operations depicted in FIG. 2 may serve to determine a shape of the pile 118 of the material 119. The angle of repose of the material 119 within the pile 118 plays a role in the shape of the pile 118 of the material 119, and may be defined as the steepest angle of descent relative to the horizontal plane (i.e., due to gravitational forces) to which the material 119 may be piled without slumping or sliding. When granular materials are poured onto a horizontal surface such as the work surface 110 of the worksite 112, a generally conical pile formulated. Within the definition of an angle of repose, the internal angle between the surface of the pile and the horizontal surface is related to the density, surface area and shapes of the particles, and the coefficient of friction of the material. Thus, based on the make-up of the material such as soil, sand, gravel, etc., the angle of repose may vary.

In examples where the pile 118 of material 119 is generally uniform in composition and the pile 118 is formed from a single dumping of the material 119, the pile 118 may be generally conical in shape. However, in situations where a plurality of loads of the material 119 are dumped together into the pile 118, a number of conical shapes are formed from the loads and run together into a non-symmetrical shape such as that shape depicted by the initial perimeter 202 of the pile 118. The shape of the pile 118 formed in this manner may be described as a "potato shape" or an irregular shape. Despite its irregular nature, the shape of the pile 118 obtained from the sensor(s) 130, 134 is useful nonetheless. For example, the perception sensor 134 working with the location sensor 130 may detect the shape of the pile 118 as described herein, and transmit that information to the system controller 122 and/or the controller 136 of the loading machine 104 for processing. The system controller 122 and/or the controller 136 may define the shape of the pile 118 based on the information. In one example, data obtained from the sensors 130, 134 may be used to detect points located along the surfaces of the pile 118. The sensors 130, 134 may send this data representing the points along the surface of the pile 118 to, for example, the controller 136 of the loading machine 104 and/or the system controller 122. The controller 136 of the loading machine 104 and/or the system controller 122 may then use this data to create a three-dimensional (3D) point cloud or other structure that is defined by the points located on an outer surface of the pile 118. In one example, the controller 136 of the loading machine 104 and/or the system controller 122 may apply an image stitching process, 3D reconstruction process, or other processes that combines multiple images or points to create a 3D image of the outer surface of the pile 118.

In order to make the movement of the material 119 as efficient as possible using a determined shaped of the pile 118, the system controller 122 and/or the controller 136 of the loading machine 104 may determine a midpoint 204 of the pile 118 of the material 119 using any information sensed by the perception sensor 134, the location sensor 130, and/or other sensor described herein. Thus, in any example, the information sensed by the perception sensor 134, the location sensor 130, and/or other sensor may include information identifying the midpoint 204. The midpoint 204 of the pile 118 of the material 119 may be obtained by analyzing a three-dimensional or two-dimensional data obtained by the at least one sensor 130, 134, and determining the midpoint of the body that is the pile 118. The midpoint 204 of the pile 118 which may be generally uniform in composition, the centroid (i.e., the midpoint 204) may be the pile's 118 center of mass. In this example, the center of mass may be defined as follows:

$$R = \frac{1}{M}\sum_{i=1}^{n} m_i r_1 \qquad \text{Eq. 1}$$

where R is the coordinates of the center of mass, M is the sum of the masses of the particles (e.g., soil particles, rocks, gravel, etc.), $m_i$ is the mass of each of the particles, and $r_i$ is the coordinates of each of the particles. In this example, the mass of the entire pile 118 may be determined through information obtained from scales or other sources that can provide the mass of the material 119 within the pile 118.

In another example, the midpoint 204 may be determined by determining the centroid of the pile 118 in a single plane or in n-dimensional space. In the example where the centroid is determined in a single plane, the mean of the position of the all the points within, for example, the initial perimeter 202 of the pile 118 along a single horizontal plane may serve as that single plane, and the centroid of the shape of that plane may serve as the midpoint 204. This example may be most effective in determining the midpoint 204 when all sides of the pile 118 have been detected by the sensor(s) 130 and 134.

In the example, where the centroid is determined in n-dimensional space (i.e., throughout all planes of the pile 118), the points along a plurality of planes may be used to identify where mass within the pile 118 is located. In this example, the midpoint 204 may be a mean of all points within the pile 118 weighted by the local density of the material 119. Assuming the pile 118 of material 119 has a generally uniform density, the midpoint 204 is the same as the centroid of the three-dimensional shape of the pile 118.

In examples where an entirety of the two-dimensional pile shape is known (i.e., via data obtained from the satellite 132, the location sensor 130, the perception sensor 134, or combinations thereof), the system controller 122 and/or the controller 136 of the loading machine 104 may utilize mathematical interpolation to find the midpoint 204.

In examples where the pile boundary 202 facing the loading machine 104 is identified, the system controller 122 and/or a controller 136 of the loading machine 104 may obtain information sensed by the location sensor 130, the perception sensor 134, or combinations thereof, wherein the information may be gathered from a front side 281 of the pile 118 opposite the back side 280. In this example, the system controller 122 and/or the controller 136 of the loading machine 104 may apply polynomial interpolation techniques to construct a smooth convex curve to connect the two outermost ends 282-1, 282-2 of the known boundary curve of the front side 281 of the pile 118. The midpoint 204 may then be determined based on the results generated via the polynomial interpolation.

In some examples and/or situations, the sensor(s) 130, 134 coupled to the loading machine 104 may not be able to detect the back side 280 of the pile 118 if the pile 118 is located at a periphery of the worksite 112 and the dump site 250 is located on a the front side 281. Further, it may be inefficient to have the loading machine 104 drive around the back side 280 of the pile since that may, in addition to result in depleting time, fuel, and other resources, may also diminish the efficiency of the operation of the loading machine 104. Thus, in some examples described herein, the loading machine 104 may operate without sensed data representing the back side 280 of the pile 118. In these examples, the loading machine 104 may operate more effectively by being instructed to utilize the most efficient loading operation based on identified and selected cut-in points 210-1, 210-2, 210-3, 210-4 (collectively referred to herein as 210) and loading directions 212-1, 212-2, 212-3, 212-4, 212-5, 212-6, 212-7, 212-8, 212-9, 212-10, 212-11, 212-12 (collectively referred to herein as 212) of the cut-in points 210. For the semi-autonomous or autonomous loading machines 104, to maximize the overall efficiency and minimize leftover material 119 that will be picked up and moved via manned and/or remote controlled machine cleanup means, the system 100 may choose the best loading cut-in point 210 and related loading direction 212 strategy which takes the shape of the pile 118 of the material 119 into consideration.

Without the present systems and methods, semi-autonomous and autonomous loading machines 104 may rely on extremely primitive ways to handle efficient movement of the pile 118 of material 119. For example, the closest path may be selected as the loading cut-in point. In another example, the direction perpendicular to an edge of the pile 118, a direction pointing to some pre-defined point, or a direction that follows the loading machine's 104 current orientation may be selected. However, these solutions typically lack efficiency. Using these primitive methods may produce undesired results as illustrated by the dashed curves 250-1, 250-2 where one relatively larger pile 118 is divided to multiple isolated smaller piles remaining for final cleanup. Further, using these primitive methods may produce undesired results illustrated by the dashed curve 251 where a thin circular layer of material remains for final cleanup. The shading lines located between the dashed curves 250-1, 250-2, 251 and the solid outer line 202 which designates the original perimeter of the pile 118 indicates the existence of material 119 that may remain after a greater portion of the pile 118 is moved if the above-described primitive methods are employed. The undesired resulting shapes of the pile 118 are depicted by curves 250-1, 250-2, 251. Loading of the material 119 from the undesired-shaped pile 118 may become more difficult and far less efficient due to lack of resistance forces provided by a convex-shaped pile 118 of material 119. Obtaining and/or maintaining the convex-shaped pile 118 during a loading operation of the loading machine 104 may provide for the largest resistance forces against the loading machine 104 which may facilitate the most material 119 to enter the work tool 140 of the loading machine 104. Further, using the above-described primitive methods, such loading machines 104 may also complete loading instances where only partial-loads of the material 119 may be obtained as there may not be enough material 119, in a significant enough aggregation to constitute a full load of the work tool 140. Users of the loading machines 104 may desire to have the semi-autonomous or autonomous loading machines 104 function similar to the manner in which a human operator would operate the loading machine. Human operators, with their experience in considering the shapes of piles 118 of various materials 119 can effectively scoop the material 119 from the pile 118, in an orderly fashion such that in a first phase, material indicated by curve 220-1 is obtained, and, thereafter in a second phase, material indicated by a dashed curve 220-2 is obtained as depicted in FIG. 2. In this manner, the volume of material 119 within the work tool 140 of the loading machine 104 may be maximized for each material 119 scooping attempt while minimizing energy spent on final cleanup of any loose or unaggregated material 119.

Thus, the system controller 122 and/or the controller 136 of the loading machine 104 may, after determining the midpoint 204 described herein, identify a plurality of candidate cut-in points 210 located on the edge of the pile 118 of material 119. In one example, a meaningful candidate cut-in point 210 may exclude any cut-in points 210 located on the back side 280 of the pile 118 of material 119. Further, the meaningful candidate cut-in points 210 may exclude any cut-in points 210 that are further away from a current position of the loading machine 104 relative to other meaningful candidate cut-in points 210. In this example, those cut-in points 210 that are further away from the current position of the loading machine 104 relative to other meaningful candidate cut-in points 210 may be disregarded. Further, cut-in points 210 are meaningful when they are movements of the loading machine 104 and its work tool 140 that cut into the pile 118 rather than cut out of or away from the pile 118.

Further, in one example, one or more ditches, ruts, potholes, build-ups or other piles 118 of material 119, or other imperfections may exist along the work surface 110 of the worksite 112. Such imperfections may also exist within loading paths that lead to one or more of the cut-in points 210. Because navigating around these imperfections may cost time and fuel for the loading machine 104, any loading path that includes an imperfection or obstruction may be excluded to maintain efficiency of the loading machine 104. By excluding loading paths that include an imperfection, the loading machine 104 may be more effective and efficient in moving the material 119 within the pile 118. In one example, the controller 136 of the loading machine 104 may select loading paths that allow the loading machine 104 to circumvent or avoid the imperfections while still being able to effectively scoop up the material 119 from the pile 118.

By way of example, a cut-in point between cut-in points 210-1 and 210-3 and located on the original perimeter 202 of the pile 118 may have been selected in a previous pass depicted in FIG. 2, and the outcome was a concave detent formed in the pile 118 as indicated by dashed line 202-1. In determining a subsequent cut-in point 210 for the pile 118 as depicted in FIG. 2 with the dashed line 202-1, a new cut-in point 210-2 may be identified. However, in this subsequent pass, should the loading machine 104 select the cut-in point 210-2, it may cause the pile 118 to be bisected which may invariably and disadvantageously result in the formation of two separate piles of material 119. Thus, when determining whether to select a cut-in point 210, the system controller 122 and/or the controller 136 of the loading machine 104 may exclude any cut-in point 210 as a candidate that might result in the bisection of the pile 118. Thus, in the example of FIG. 2, the system controller 122 and/or the controller 136 of the loading machine 104 may select cut-in points 210-1 and/or 210-3 since they are located on a side of the pile 118 (i.e., the front side 281) closest to the loading machine 104 and/or in the field of view of the location sensor 130 and/or the perception sensor 134.

In the examples described herein, the number of the candidate cut-in points 210 may be predetermined by utilizing the computational power of the system controller 122 and/or the controller 136 (including an ECM that may be or included within the controllers 122, 136). In one example, the predetermined number of candidate cut-in points 210 may be between 1 and 20. Further, in one example, the cut-in points 210 may be evenly distributed along an edge of the pile 118 facing the loading machine 104.

After the midpoint 204 and the plurality of cut-in points 210 are determined, an effective cut-in point 210 may be selected based on the criteria described above. Subsequently, for the selected cut-in point and/or for each candidate cut-in point, a plurality of candidate loading directions 212 may be identified by the system controller 122 and/or the controller 136. A candidate loading direction 212 may include any direction originating at the cut-in points 210 an into the pile 118 such that the direction cuts into the pile 118 instead of cutting away from and/or out of the pile 118. Further, the number of candidate loading directions 212 identified by the system controller 122 and/or the controller 136 may be predetermined by the computational power of the of the system controller 122 and/or the controller 136 (including an ECM that may be or included within the controllers 122, 136). For example, the system controller 122 and/or the controller 136 may identify between 1 and 10 candidate loading directions 212 for each cut-in point 210. Further, like the cut-in points 210, the loading directions 212 may be evenly distributed throughout an angular range. For example, if three loading directions 212 are identified for a cut-in point 210, the angle between the first and the second of the three loading directions 212 may be identical to the angle between the second and the third of the three loading directions 212.

For the selected cut-in point 210 and loading direction 212, or for each identified cut-in point 210 and loading direction 212 the system controller 122 and/or the controller 136 of the loading machine 104 may evaluate a cost function associated with selecting one cut-in point 210 and loading direction 212 pair over another. In one example, the cost function may be defined as follows:

$$\text{Cost} = w_1 - w_2 + w_3 + w_4 \qquad \text{Eq. 2}$$

where $w_1$ is a travel distance between a current location of the loading machine 104 and the cut-in point 210, $w_2$ is the distance between the cut-in point 210 and the midpoint 204 of the pile 118 of material 119, $w_3$ is a deviation between the loading direction 212 and the direction from the cut-in point 210 to the midpoint 204 of the pile 118 of material 119, and $w_4$ is an integral of steering force applied from the reverse point 255 to the cut-in point 210 of the pile 118.

In one example, the variables within Eq. 2 are non-negative scalars. In this example, the non-negative scalars may be predetermined by existing historical analysis over customer data using, for example, machine learning techniques and/or linear regression. Machine learning uses algorithms and statistical models to cause the loading machines 104 to perform a specific task without continuous explicit instructions input. Here the specific task being learned is the semi-autonomous or autonomous movement of the material 119 within the pile 118 throughout the worksite 112 in a cost-effective manner Cost-effectiveness may include consideration of time taken to move the loading machine 104, fuel consumed in moving the loading machine 104, wear on the fuel machine 104 and components of the fuel machine 104, and other cost-effective considerations, and these resources may be optimized and/or conserved. In this example, the machine learning may be performed by the system controller 122 and/or the controller 136 of the loading machine 104 and data may be stored with associated data storage devices. The system controller 122 and/or the controller 136 of the loading machine 104 may rely on patterns and inferences as to how to move to loading machine 104 in the most effective manner A mathematical model may be built by the system controller 122 and/or the controller 136 of the loading machine 104 based on training data obtained from, for example, sensed operation of the loading machine 104 by a human operator. This training data may serve as a basis for the system controller 122 and/or the controller 136 of the loading machine 104 to determine how to predict or decide to move the loading machine 104 without being explicitly programmed to perform the task of moving the material 119 from the pile 118.

Linear regression includes a mathematical method of modeling the relationship between a scalar response (i.e., a dependent variable) and one or more explanatory variables (i.e., independent variables). Relationships within linear regression are modeled using linear predictor functions whose unknown model parameters are estimated from data. The resultant linear models are useful in determining a conditional probability distribution of a response given the values of the predictors. In an example where linear regression is utilized, historical actions such as previously-executed cut-in points 210 and loading directions 212 chosen and executed by human operators under similar situations may be fit into an approximation linear function. Weights for each of the variables within Eq. 2 may then be determined through regression. In one example, this linear regression technique may be performed offline in order to task other computing devices with performing such processing without utilizing the computational resources associated with the system 100 or without over-burdening the system controller 122 and/or the controller 136 of the loading machine 104.

In the examples described above, the variable $w_4$ may be set to 0 to ignore differences on wearing of the steering system and/or tires of the loading machine 104. Based on the examples described above, the system 100 may the cut-in point 210 and loading direction 212 that corresponds to the lowest cost function, and use that selected cut-in point 210 and loading direction 212 to execute a pass within the material movement process performed by the loading machine 104. The above process may be executed each time the loading machine 104 makes a pass to obtain more material 119 from the pile 118.

In this manner, the loading strategy defined by the machine learning and/or linear regression methods considers not only the travel distance, but also penalizes actions potentially destroying the convex shape of the pile 118 of material 119 that is obtained and maintained during human operation and which minimizes clean-up of unaggregated material 119. As a result, the loading procedure of the semi-autonomously- or autonomously-operated loading machines 104 may more closely mimic the operational expertise of human operators. Further, the strategies described herein may provide optimal cut-in point 210 and loading direction 212 selection for each pass, thus minimize half-bucket passes, and minimize efforts spent on cleaning thin-layer leftovers or isolated-small-pile leftovers.

Figure 3:
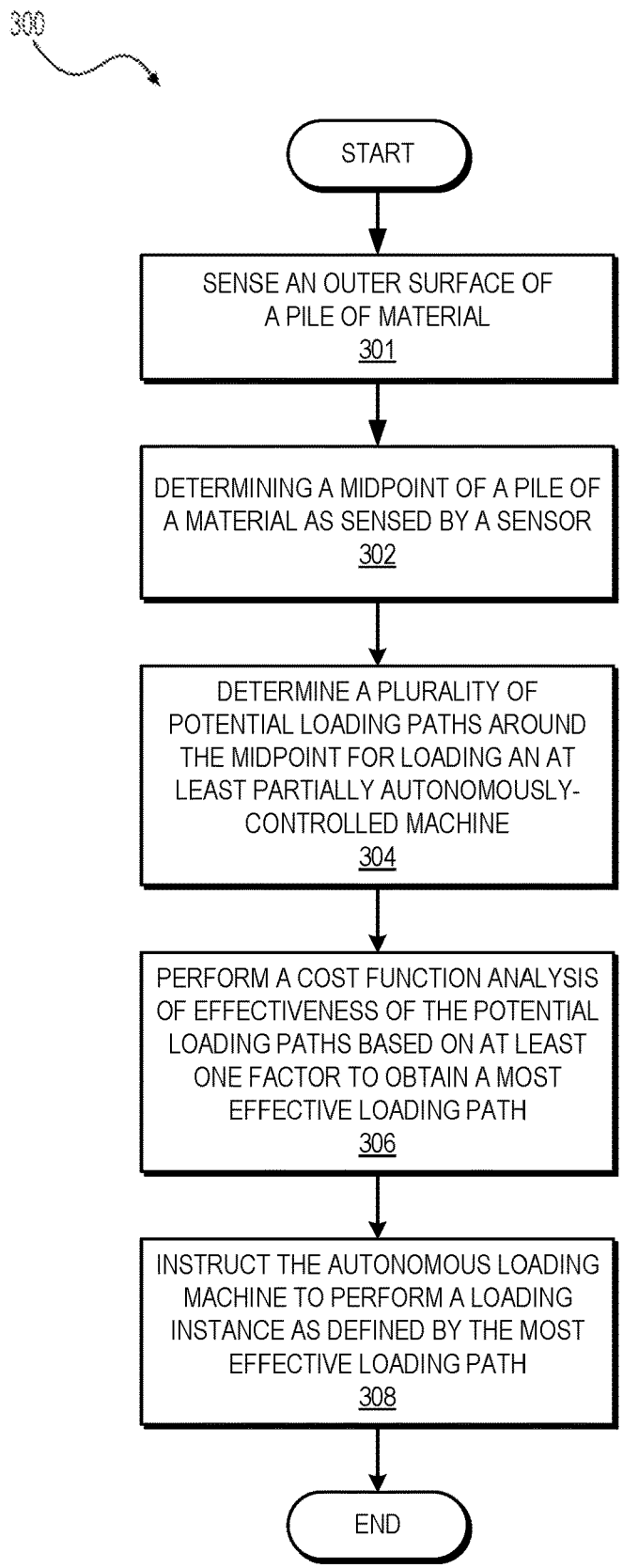
FIG. 3 is a flow chart depicting an example method associated with the system shown in FIGS. 1 and 2.

Having described the system 100 of FIG. 1 and the process depicted in FIG. 2, reference will now be made to FIGS. 3 and 4. FIG. 3 is a flow chart depicting an example method 300 associated with the system 100 shown in FIGS. 1 and 2. The method 300 may include, at 301, sensing, with the sensors 130, 134, an outer surface of a pile 118 of material 119 as described above. In one example, data obtained from the sensors 130, 134 may be used to detect points located along the surfaces of the pile 118. The sensors 130, 134 may send this data representing the points along the surface of the pile 118 to, for example, the controller 136 of the loading machine 104 and/or the system controller 122.

At 302, the method 300 may include determining, with a controller 136 located on an at least partially autonomously-controlled machine such as the loading machine 104 and/or the system controller 122, a midpoint 204 of a pile 118 of a material 119 as sensed by a sensor such as the location sensor 130 and/or the perception sensor 134. In one example, the controller 136 may be assisted by or controlled by the system controller 122. In one example, the location sensor 130 and/or the perception sensor 134 may be used to sense the pile 118 and identify data representing the coordinates or 3D locations along the surface of the pile 118. The sensors 130, 134 may send this data to the controller 136 of the loading machine 104 and/or the system controller 122 for processing. In one example, the data representing the coordinates or 3D locations along the surface of the pile 118 may be sent to the controller 136 of the loading machine 104 and/or to the system controller 122 via the network 124, the central station 108, and/or the communication devices 126.

At 304, the controller 122, 136 may determine a plurality of potential loading paths around the midpoint 204 for loading the machine 104. This determination may be based on the data obtained from the location sensor 130 and/or perception sensor 134. In the examples described herein, the loading paths may be determined based on a path determination logic that considers a number of rules in identifying the loading paths. In one example, a loading path may be considered if it's termination at the boundary of the pile 118 includes a face of the pile 118 that is convex with respect to the work tool 140 of the loading machine 104. If the termination at the boundary of the pile 118 includes a face of the pile 118 that is concave with respect to the loading machine 104, loading the material 118 at that point may cause the pile 118 to become bisected or at least further bisected. Thus, any loading path that may lead to a bisection of the pile 118 may be excluded as a candidate loading path. Conversely, a loading path that addresses a convex surface of the pile 118 is less likely to lead to such a bisection. Further, loading paths that may bring about a decrease in optimization and/or conservation in cost-effective movement of the loading machine 104 may also be excluded as a candidate loading path. Other rules may be applied in determining the loading paths, and the controller(s) 136, 122 may use these rules along with the data obtained from the sensors 130, 134 to determine the boundary of the pile 118 and identify loading paths along that boundary that follow the prescribed rules.

The potential loading paths include at least one cut-in point 210 with the at least one cut-in point 210 including at least one loading direction 212. At 306, the controller 122, 136 may select a primary loading path of the potential loading paths based on a cost function analysis. The controller 136 of the loading machine 104 and/or to the system controller 122 performs the cost function analysis described above to analyze the effectiveness of the potential loading paths (including the cut-in points 210 and loading directions 220) based on at least one factor to obtain a most effective loading path. Like the determination as to how the loading paths are identified, a number of rules may be applied in determining which of the loading paths would be most effective. For example, one rule may include a determination as to which cut-in point 210 that terminates the loading path is closest to the loading machine 104 after the loading machine exits the reverse point 255 when the machine is returning from the dump site 250 and approaching the pile 118 located on the work surface 110 of the worksite 112. In another example, a rule may include determining which of a number of loading paths terminates at a cut-in point 210 that is located at most convex boundary of the pile 118 as determined by the data from the sensors 130, 134 and the controller(s) 136, 122. Thus, the controller(s) 136, 122 may make this determination by applying the defined rules.

At 308, the system controller 122 and/or the controller 136 of the loading machine 104 may cause the loading machine 104 to perform a loading instance as defined by the primary loading path. In an instance where the system controller 122 provides the instruction to the loading machine 104, the system controller 122 may send a signal to the loading machine 104 via the network 124, the central station 108, and/or the communication devices 126. The signal may include data defining the actions the loading machine 104 is to execute in order to move material 119 within the pile 118 using the most effective loading path.

Figure 4:
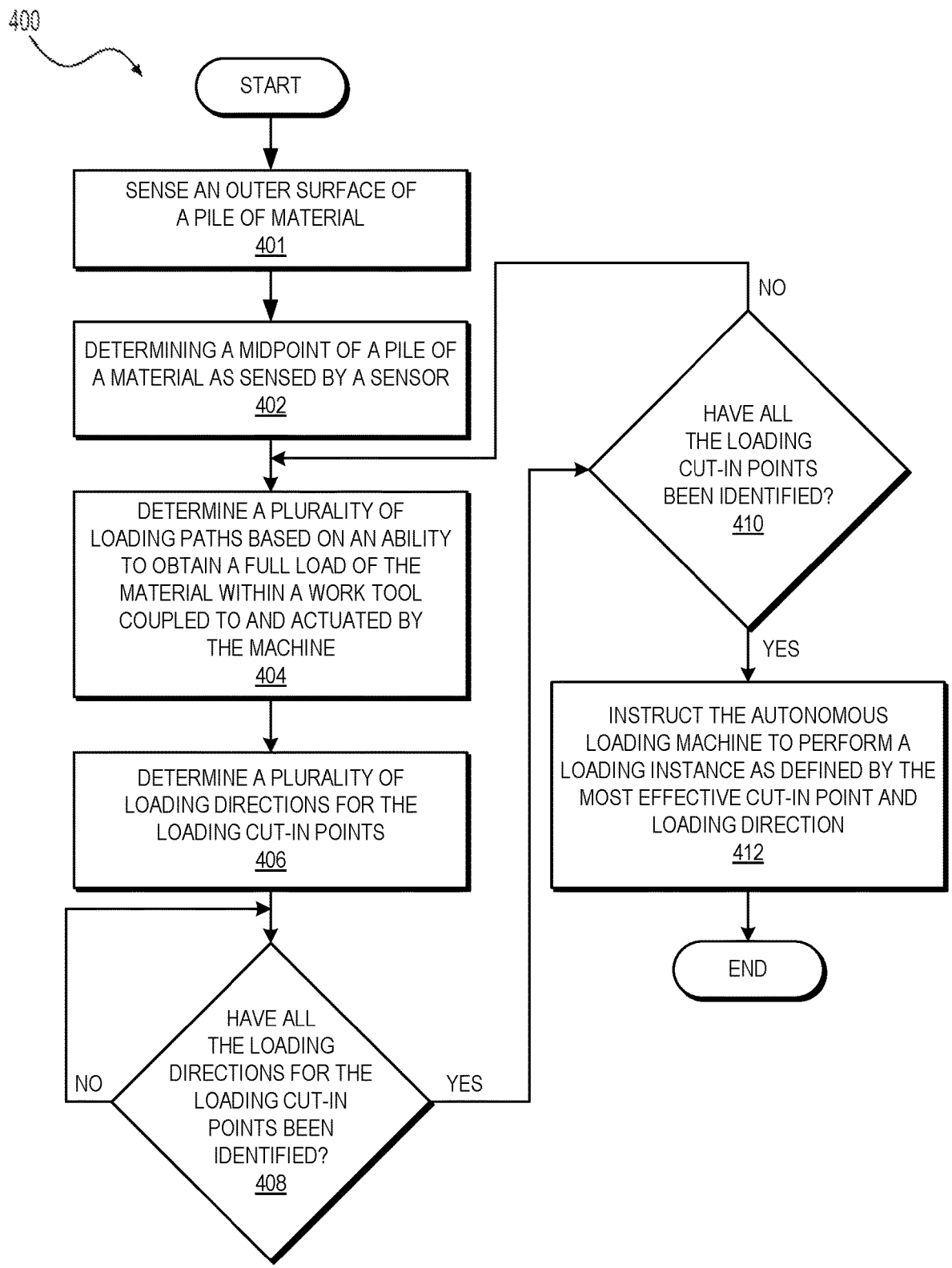
FIG. 4 is a flow chart depicting another example method associated with the system shown in FIGS. 1 and 2.

FIG. 4 is a flow chart depicting an example method 400 associated with the system shown in FIGS. 1 and 2. The method 400 may include, at 401, sensing, with the sensors 130, 134, an outer surface of a pile 118 of material 119 as described above. In one example, data obtained from the sensors 130, 134 may be used to detect points located along the surfaces of the pile 118. The sensors 130, 134 may send this data representing the points along the surface of the pile 118 to, for example, the controller 136 of the loading machine 104 and/or the system controller 122.

The method 400 may also include, at 402, with a controller 136 located on an at least partially autonomously-controlled machine such as the loading machine 104 and/or the system controller 122, determining a midpoint 204 of a pile 118 of a material 119 as sensed by a sensor such as the location sensor 130 and/or the perception sensor 134. In one example, the controller 136 may be assisted by or controlled by the system controller 122. In one example, the location sensor 130 and/or the perception sensor 134 may be used to image the pile 118 of material 119 and may send data representing the image(s) of the pile 118 via the network 124, the central station 108, and/or the communication devices 126 to the system controller 122.

At 404, the controller 122, 136 may determine a plurality of loading cut-in points 210 based on an ability for the loading machine 104 to obtain a full load of the material 119 within a work tool 140 coupled to and actuated by the loading machine 104. This determination may be based on the data obtained from the location sensor 130 and/or perception sensor 134, and the controllers 122, 136 determining an amount of material 119 at that point in the pile 119 that may fill a volume of the work tool 140. The loading cut-in points 210 may include at least one cut-in point 210.

At 406, the method 400 may include determining a plurality of loading directions 212 for each of the loading cut-in points 210 identified at 404. As described herein, a number of rules may be applied in determining which of the cut-in points would be most effective. For example, one rule may include a determination as to which cut-in point 210 that terminates a loading path is closest to the loading machine 104 after the loading machine exits the reverse point 255. In another example, a rule may include determining which of a number of cut-in points 210 is located at a most convex boundary of the pile 118 as determined by the data from the sensors 130, 134 and the controller(s) 136, 122. Thus, the controller(s) 136, 122 may make this determination by applying the defined rules.

The method 400 may also include, at 408, determining whether additional loading directions 220 for all the loading cut-in points 210 been identified by the controller 122, 136. In one example, the controllers 122, 136 may determine that one loading direction 220 such as, for example, loading direction 212-2 may result in the work tool 140 of the loading machine 104 not capturing a full volume within the work tool 140 since it will graze off the side of the pile 118. In this example, selecting loading directions 212-10 or 212-11 may result in a full volume within the work tool 140. In response to a determination that additional potential loading directions 220 for all the loading cut-in points 210 (including all loading directions 220) are to be identified (408, determination YES), the method 400 may loop back to before 406 and additional loading directions 220 for the cut-in points 210 may be determined. This loop back to before 406 may occur any number of times to obtain a larger or exhaustive number of loading directions 220 for each of the cut-in points 210.

In response to a determination that additional potential loading directions 220 for all the loading cut-in points 210 have been identified by the controller 122, 136 (408, determination NO), a second determination as to whether additional loading cut-in points 210 are to be identified at 410 may be performed. At 410, in response to a determination that additional loading cut-in points 210 are to be identified (410, determination YES), the method 400 may loop back to 404 to determine additional loading cut-in points 210. This loop back to before 404 may occur any number of times to obtain a larger or exhaustive number of cut-in points 210. It is noted here, that at 406, the loading directions 220 for the additional cut-in points 210 may be also identified. In this manner, all potential cut-in points 210 and their respective loading directions 220 are identified by the system controller 122 and/or the controller 136 of the loading machine 104. In response to a determination that additional cut-in points 210 have been identified (410, determination NO), the method 400 may proceed to 412.

At 412, the system controller 122 and/or the controller 136 of the loading machine 104 may cause the loading machine 104 to perform a loading instance as defined by a selected, primary cut-in point 210 and loading direction 220. In an instance where the system controller 122 provides the instruction to the loading machine 104, the system controller 122 may send a signal to the loading machine 104 via the network 124, the central station 108, and/or the communication devices 126. The signal from the system controller 122 and/or the controller 136 of the loading machine 104 may include data defining the actions the loading machine 104 is to execute in order to move material 119 within the pile 118 using a primary loading path. The process 400 of FIG. 4 may iteratively be performed many number of times to move the material 119 within the pile 118 to the dump site 250. In this manner, iterative determination like primary, secondary, tertiary, etc of the midpoint 204 can be computed in each iteration. Further, the loading paths selected throughout the material moving operation may be based on the cost function analysis described herein and the rules applied to determining which of the cut-in points 210 and loading directions 220 are most cost effective.

INDUSTRIAL APPLICABILITY

The present disclosure describes systems and methods for semi-autonomously or autonomously moving material via a loading machine 104 such as a wheeled or tracked loader, a front shovel, an excavator, a cable shovel, a stack reclaimer, or any other similar machine. The movement of the material may be based on identification of a midpoint 204, a number of cut-in points 210, and a number of loading directions 220 for each of the cut-in points 210. Such systems and methods may be used to more efficiently move the material using the semi-autonomous or autonomous loading machines 104 by not creating situations where a pile 118 of material 119 is bisected or where the pile 118 is spread out during a number of passes such that smaller piles of the material are created and clean-up processes to capture the spread material takes place.

While aspects of the present disclosure have been particularly shown and described with reference to the examples above, it will be understood by those skilled in the art that various additional examples may be contemplated by the modification of the disclosed machines, systems and methods without departing from the spirit and scope of what is disclosed. Such examples should be understood to fall within the scope of the present disclosure as determined based upon the claims and any equivalents thereof.

What is claimed is:

1. A method, comprising:
   sensing, with at least one sensor, a shape of an outer surface of a pile of material;
   determining, with a controller associated with a machine, a midpoint of the pile of material based on the shape of the outer surface of the pile sensed by the at least one sensor;
   determining, with the controller, a plurality of potential loading paths around the midpoint of the pile, wherein each loading path of the plurality of potential loading paths is associated with a respective direction from which the machine could approach the pile;
   selecting, with the controller, a primary loading path, of the plurality of potential loading paths, based on a cost function analysis; and
   causing, with the controller, the machine to at least partially autonomously perform a loading instance in which the machine engages the pile at least in part by traveling in a direction defined by the primary loading path.

2. The method of claim 1, wherein:
   the pile includes a proximal side disposed facing the machine, and a distal side disposed opposite the proximal side, and
   the plurality of potential loading paths excludes paths that lead to the distal side of the pile.

3. The method of claim 1, wherein the plurality of potential loading paths excludes paths that include obstacles.

4. The method of claim 1, wherein the cost function analysis is performed based on at least one factor including a travel distance, a time to travel the travel distance, a steering force, an angle of repose of the material, and work tool movement distances.

5. The method of claim 1, wherein determining the plurality of potential loading paths includes determining the plurality of potential loading paths based on an ability to obtain a full load of the material within a work tool coupled to and actuated by the machine.

6. The method of claim 1, further including:
   determining, with the controller, a plurality of loading cut-in points associated with the pile based on an ability for the machine to obtain a full load of the material within a work tool coupled to and actuated by the machine; and
   determining, with the controller, a plurality of loading directions for the plurality of loading cut-in points.

7. The method of claim 1, wherein:
   the cost function analysis includes determining whether individual potential loading paths, of the plurality of potential loading paths, would result in a bisection of the pile of the material, and
   in response to a determination that a first potential loading path, of the plurality of potential loading paths, would result in the bisection of the pile of material, removing the first potential loading path from the plurality of potential loading paths under consideration.

8. The method of claim 1, further comprising iteratively:
   performing, with the controller, a first determination of the midpoint of the pile of material based on a first shape of the outer surface of the pile sensed by the at least one sensor;
   sensing, with the at least one sensor, a second shape of the outer surface of the pile after performance of a first loading instance associated with the pile; and performing, with the controller, a second determination of the midpoint of the pile of material based on the second shape of the outer surface of the pile sensed by the at least one sensor.

9. The method of claim 1, wherein:
the plurality of potential loading paths are associated with a plurality of cut-in points located on an edge of the pile,
individual cut-in points, of the plurality of cut-in points, are associated with a plurality of candidate loading directions from which the machine could approach the pile, and
the primary loading path selected by the controller is associated with:
a selected cut-in point, of the plurality of cut-in points, and
a selected loading direction, of the plurality of candidate loading directions associated with the selected cut-in point.

10. The method of claim 1, wherein the plurality of potential loading paths excludes paths that pass across imperfections or obstructions.

11. A system, comprising:
a machine comprising a work tool configured to carry material as the machine travels along a work surface of a worksite, wherein the machine is an at least partially-autonomous machine;
at least one sensor configured to sense a shape of an outer surface of a pile of the material; and
a controller in communication with the at least one sensor and the machine, the controller being configured to:
determine a midpoint of the pile of the material based on the shape of the outer surface of the pile sensed by the at least one sensor;
determine a plurality of potential loading paths around the midpoint of the pile, wherein each loading path of the plurality of potential loading paths is associated with a respective direction from which the machine could approach the pile;
select a primary loading path, of the plurality of potential loading paths, based on a cost function analysis; and
cause the machine to at least partially autonomously perform a loading instance in which the machine engages the pile at least in part by traveling in a direction defined by the primary loading path.

12. The system of claim 11, wherein the at least one sensor comprises at least one of a position sensor, an imaging device, a lidar device, a radar device, a sonar device, or a satellite imaging device.

13. The system of claim 11, wherein the cost function analysis is performed based on at least one factor including a travel distance, a time to travel the travel distance, a steering force, an angle of repose of the material, and work tool movement distances.

14. The system of claim 11, wherein determining the plurality of potential loading paths includes determining a plurality of loading directions based on an ability to obtain a full load of the material within the work tool, the work tool being coupled to and actuated by the machine.

15. The system of claim 11, wherein determining the plurality of potential loading paths for loading the machine includes:
determining a plurality of loading cut-in points associated with the pile based on an ability for the machine to obtain a full load of the material within the work tool the work tool being coupled to and actuated by the machine; and
determining a plurality of loading directions for the plurality of loading cut-in points.

16. A controller, comprising:
at least one communication device configured to communicate, via a communications network, with:
a machine comprising a work tool configured to carry material as the machine travels along a work surface; and
at least one sensor configured to sense a shape of an outer surface of a pile of the material; and
at least one processor configured to:
determine a midpoint of the pile of the material based on the shape of the outer surface of the pile sensed by the at least one sensor;
determine a plurality of potential loading paths around the midpoint of the pile, wherein each loading path of the plurality of potential loading paths is associated with a respective direction from which the machine could approach the pile;
select a primary loading path, of the plurality of potential loading paths, based on a cost function analysis of at least one factor to obtain a most effective loading path; and
cause the machine to at least partially autonomously perform a loading instance in which the machine engages the pile at least in part by traveling in a direction defined by the primary loading path.

17. The controller of claim 16, wherein the controller causes the machine to at least partially autonomously perform the loading instance by transmitting an instruction to the machine from a remote location via the communication network.

18. The controller of claim 16, wherein the machine is a loading machine.

19. The controller of claim 16, wherein:
the pile includes a proximal side disposed facing the machine, and a distal side disposed opposite the proximal side, and
the plurality of potential loading paths excludes paths that lead to the distal side of the pile.

20. The controller of claim 16, wherein determining the plurality of potential loading paths includes:
determining a plurality of loading cut-in points associated with the pile based on an ability of the machine to obtain a full load of the material within the work tool, the work tool being coupled to and actuated by the machine; and
determining a plurality of loading directions for the plurality of loading cut-in points.

* * * * *